(12) United States Patent
Ferkel

(10) Patent No.: US 11,698,153 B2
(45) Date of Patent: Jul. 11, 2023

(54) FLUID JOINT ASSEMBLY ADJUSTABLE FROM PRIMARY TO BACKUP SEALING STATE AND FLUID CONNECTOR FOR SAME

(71) Applicant: Caterpillar Inc., Peoria, IL (US)

(72) Inventor: Bailey Justin Ferkel, Menominee, MI (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 17/484,459

(22) Filed: Sep. 24, 2021

(65) Prior Publication Data
US 2023/0096808 A1 Mar. 30, 2023

(51) Int. Cl.
*F16L 19/02* (2006.01)
*F16L 19/025* (2006.01)

(52) U.S. Cl.
CPC ......... *F16L 19/0218* (2013.01); *F16L 19/025* (2013.01); *F16L 2201/10* (2013.01)

(58) Field of Classification Search
CPC . F16L 19/0231; F16L 19/0218; F16L 19/025; F16L 2201/10
USPC .................................................. 285/89, 92
See application file for complete search history.

(56) References Cited

U.S. PATENT DOCUMENTS

| | | | | |
|---|---|---|---|---|
| 4,801,160 A * | 1/1989 | Barrington | .......... | F16L 19/0218 285/354 |
| 5,131,689 A * | 7/1992 | Bates | ...................... | F16L 27/06 285/92 |
| 5,215,336 A * | 6/1993 | Worthing | ............... | F16L 19/005 285/92 |
| 5,362,109 A * | 11/1994 | Pacht | ................... | F16L 19/0206 285/92 |
| 5,533,765 A | 7/1996 | Williamson et al. | | |
| 5,871,239 A * | 2/1999 | Boscaljon | ............. | F16L 19/005 285/92 |
| 5,882,044 A * | 3/1999 | Sloane | ................... | F16L 19/005 285/92 |
| 6,050,609 A * | 4/2000 | Boscaljon | ............. | F16L 19/005 285/92 |
| 7,425,022 B2 * | 9/2008 | Guest | .................. | F16L 37/0925 285/92 |
| 8,960,726 B2 * | 2/2015 | Nick | ...................... | F16L 19/005 285/92 |
| 9,822,913 B2 | 11/2017 | Considin, Jr. et al. | | |
| 10,359,141 B2 | 7/2019 | Clements et al. | | |

(Continued)

FOREIGN PATENT DOCUMENTS

CA 2869946 A1 * 5/2015 .......... F16L 19/0231
CN 203880267 U 10/2014
(Continued)

*Primary Examiner* — David Bochna

(57) ABSTRACT

A fluid connector in a fluid joint assembly such as in a machine hydraulic system includes a connector body having a stem with a seal face extending circumferentially around a connector axis at a backup sealing location. A non-metallic seal is upon the stem and extends circumferentially around the connector axis at a primary sealing location. The fluid connector also includes a swivel nut including threads and a snap retainer and supported for rotation upon the stem. The fluid connector can establish a primary sealing state by way of hand installation, and can be torqued to a backup sealing state to provide a robust metal-to-metal seal.

18 Claims, 4 Drawing Sheets

(56) References Cited

U.S. PATENT DOCUMENTS

| | | | |
|---|---|---|---|
| 2004/0017077 A1* | 1/2004 | Vyse | F16L 19/005 |
| | | | 285/92 |
| 2004/0056481 A1* | 3/2004 | Do | F16L 19/005 |
| | | | 285/92 |
| 2004/0061329 A1* | 4/2004 | Guest | F16L 19/005 |
| | | | 285/92 |
| 2007/0267869 A1* | 11/2007 | Patel | F16L 19/025 |
| | | | 285/386 |
| 2015/0276110 A1 | 10/2015 | Parekh et al. | |
| 2019/0331263 A1* | 10/2019 | Langer | F16L 19/0218 |
| 2020/0041047 A1* | 2/2020 | Mcentyre | F16L 19/0231 |
| 2021/0025524 A1 | 1/2021 | Patch et al. | |
| 2021/0317931 A1* | 10/2021 | Travis | F16L 19/0218 |

FOREIGN PATENT DOCUMENTS

| | | | | |
|---|---|---|---|---|
| DE | 202006008916 | | 8/2006 | |
| DE | 102014100758 A1 * | | 7/2015 | F16L 19/0231 |
| EP | 1760382 A2 * | | 3/2007 | F16L 19/0231 |
| FR | 79036 | | 10/1962 | |
| WO | 2012163951 | | 12/2012 | |

\* cited by examiner

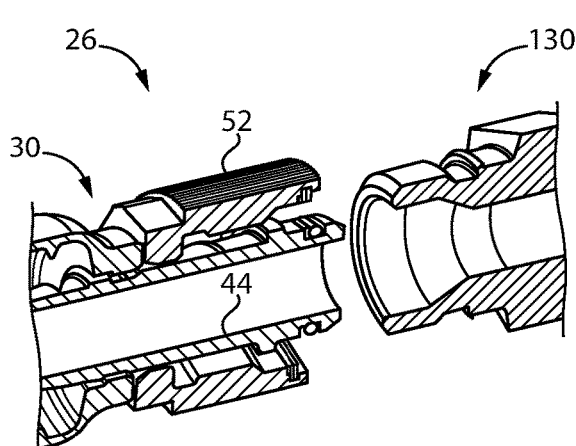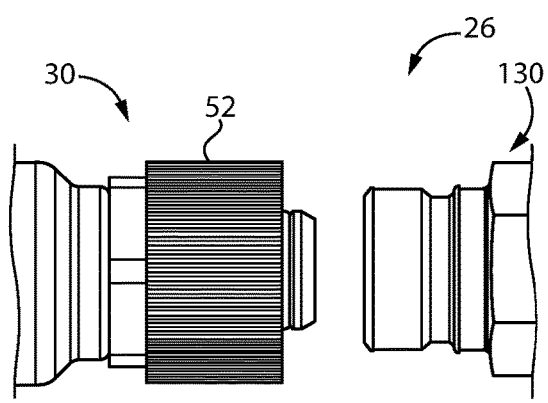
FIG. 6  FIG. 7
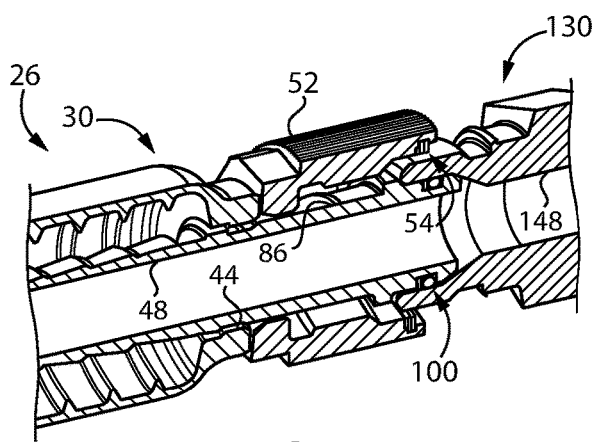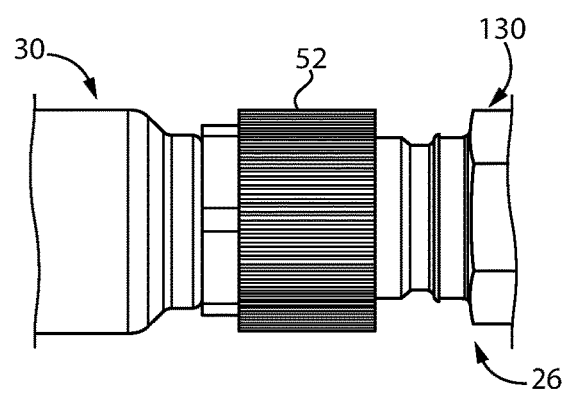
FIG. 8  FIG. 9
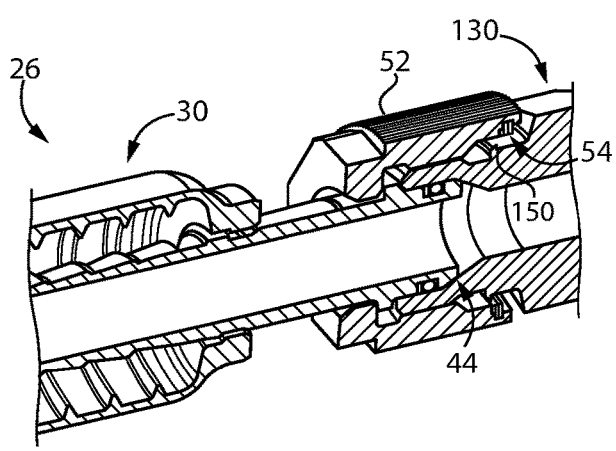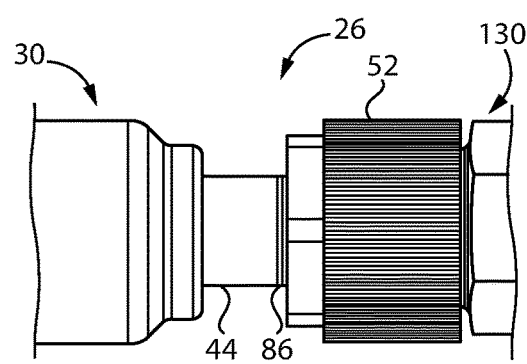
FIG. 10  FIG. 11

FLUID JOINT ASSEMBLY ADJUSTABLE FROM PRIMARY TO BACKUP SEALING STATE AND FLUID CONNECTOR FOR SAME

TECHNICAL FIELD

The present disclosure relates generally to a fluid connector, and more particularly to a fluid connector in a fluid joint assembly adjustable from a primary sealing state to a backup sealing state.

BACKGROUND

Hydraulic systems are used throughout the world in virtually innumerable applications. Most modern off-highway machinery, as well as many on-highway machines, and numerous different industrial applications, rely upon hydraulic systems. A typical hydraulic system includes one or more hydraulic pumps, tanks, accumulators, hydraulic actuators, valves, and numerous hydraulic couplings that connect various pressurized hydraulic lines fluidly connecting the various components. In a typical off-highway machine application, movement of one or more lift arms, booms, and implements such as buckets or blades, for example, is controlled by a supply and return of hydraulic fluid through the pressurized hydraulic fluid lines.

Hydraulic couplings are typically connected and disconnected to install or remove equipment from a machine, service the hydraulic system, or to replace the couplings themselves in the event of leakage or failure. Service technicians are therefore routinely required to connect and disconnect such hydraulic couplings.

Connection and disconnection of hydraulic couplings can be relatively labor intensive, and can require specialized training and/or tools to enable a user to properly install, remove, or service the equipment in an optimal and efficient manner. Failure to satisfy a torque specification, for instance, can result in leakage, seal damage, or difficulties in disassembly. In one typical scenario a technician is required to use a torque wrench to secure threaded hydraulic couplings at a specified torque, and then place a marking on the coupling itself to confirm the torque specification has been satisfied.

Various other efforts have been made over the years to simplify hydraulic servicing activities. Some strategies make an effort to provide simplified and robust connections in an effort to mitigate risk of installation or deinstallation errors, but are themselves overly complex and labor intensive. One example of a quick connector for hydraulic hose couplings is set forth in U.S. Pat. No. 9,822,913 to Considine, Jr. et al. In the strategy proposed by Considine, Jr. et al., a hydraulic fluid line coupling system includes a coupling having a female fitting, a male fitting, first and second elastomeric seals between the fittings, and a locknut securing the female fitting to the male fitting. The locknut includes threads. While the strategy proposed by Considine. Jr. et al. may have various applications, there is always room for improvement and development of alternative strategies.

SUMMARY

In one aspect, a fluid connector includes a connector body defining a connector axis, and including a line-connecting portion, a stem including a seal face extending around the connector axis at a backup sealing location, and a fluid passage extending through the line-connecting portion and the stem. The fluid connector further includes a non-metallic seal upon the stem and extending around the connector axis at a primary sealing location, and a swivel nut including threads and a snap retainer and being supported for rotation upon the stem.

In another aspect, a fluid joint assembly includes a first fluid connector defining a connector axis, and including a first seal face extending around the connector axis, and a swivel nut. The fluid joint assembly further includes a second fluid connector coaxially arranged with the first fluid connector and including a second seal face extending around the connector axis and positioned at an axial gap from the first seal face. The fluid joint assembly further includes a non-metallic seal forming a primary seal between the first fluid connector and the second fluid connector, and a snap retainer coupled between the swivel nut and the second fluid connector. The snap retainer limits translation of the swivel nut in a deinstallation direction to maintain the primary seal, and permits translation of the swivel nut in a backup sealing direction to establish a backup seal formed by metal-to-metal contact between the first seal face and the second seal face.

In still another aspect, a fluid connection apparatus includes a fluid connector having a connector body including formed therein a fluid passage defining a connector axis and extending between a first axial connector end and a second axial connector end having a seal face extending around the connector axis and oriented obliquely to the connector axis. The connector body further includes a stop protrusion, and a seal groove formed in the connector body and extending around the connector axis at a location axially between the stop protrusion and the seal face. The fluid connection apparatus further includes a swivel nut supported for rotation upon the connector body and for translation between a first stop position in contact with the stop protrusion, and a second stop position. The swivel nut includes a journal surface in contact with the connector body, an inside snap retainer surface oriented normal to the connector axis, and internal threads axially between the journal surface and the inside snap retainer surface.

BRIEF DESCRIPTION OF THE DRAWINGS

FIG. 6 is a sectioned diagrammatic view of a fluid joint assembly at one stage of assembly, according to one embodiment;

FIG. 7 is a side diagrammatic view of the fluid joint assembly at the stage depicted in FIG. 6;

FIG. 8 is a sectioned diagrammatic view of a fluid joint assembly at another stage of assembly, according to one embodiment;

FIG. 9 is a side diagrammatic view of the fluid joint assembly at the stage depicted in FIG. 8;

FIG. 10 is a sectioned diagrammatic view of a fluid joint assembly at yet another stage of assembly, according to one embodiment; and FIG. 11 is a side diagrammatic view of a fluid joint assembly at the stage depicted in FIG. 10.

DETAILED DESCRIPTION

Figure 1:
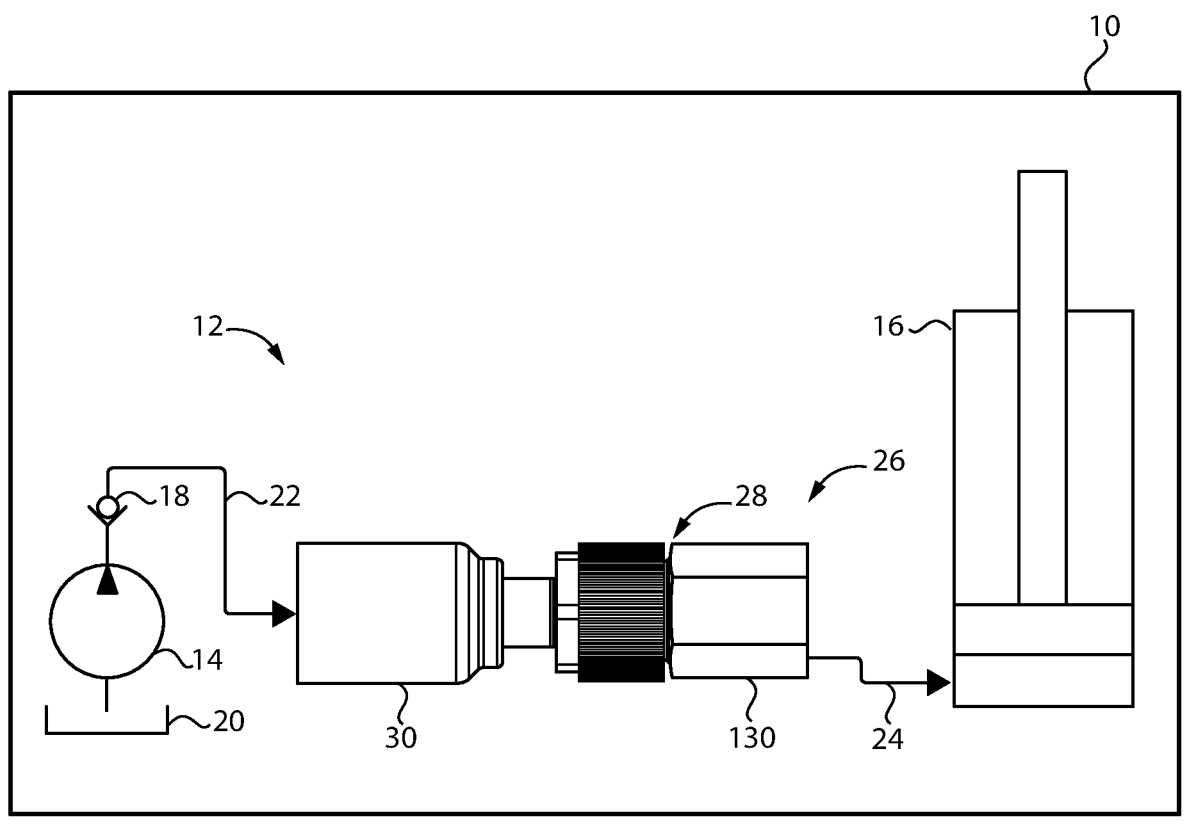
FIG. 1 is a diagrammatic view of a machine including a fluid joint assembly in a hydraulic system, according to one embodiment.
Figure 2:
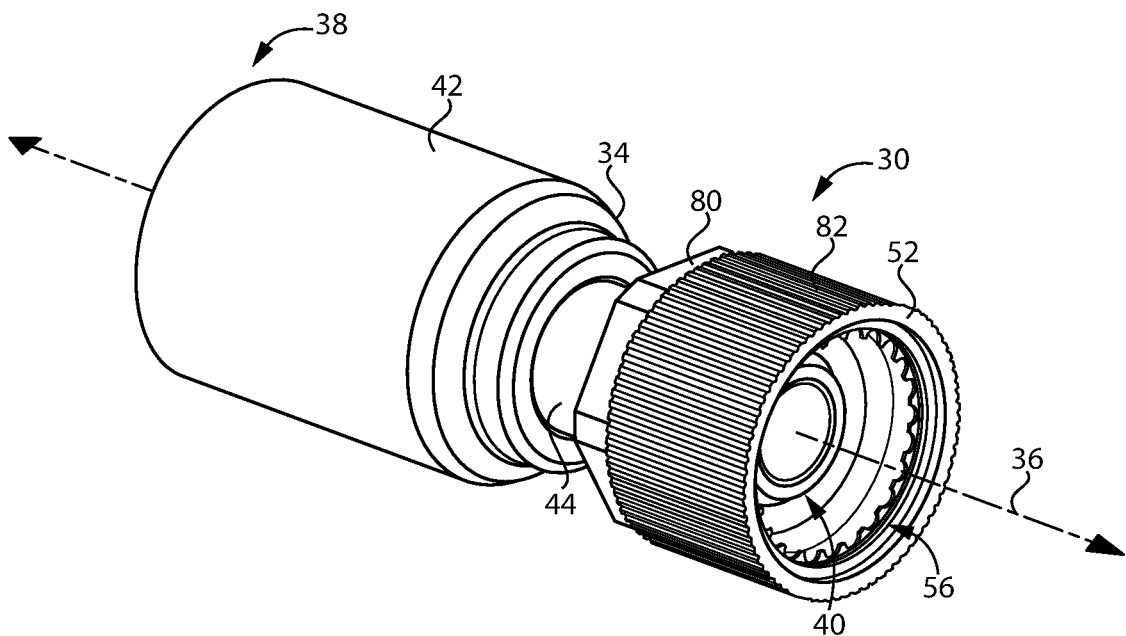
FIG. 2 is a diagrammatic view of a fluid connector, according to one embodiment.
Figure 3:
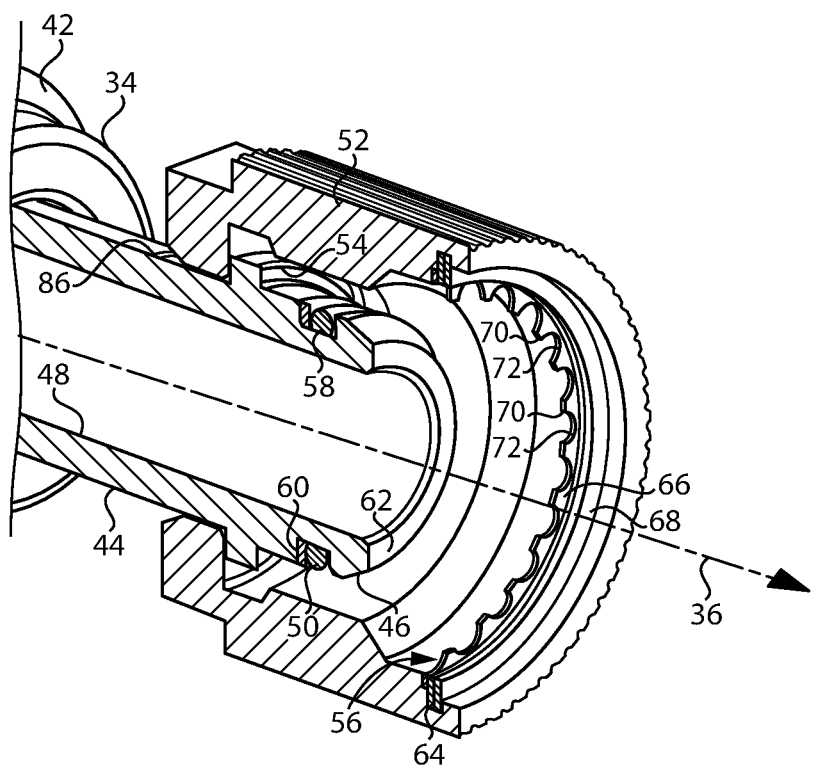
FIG. 3 is a sectioned diagrammatic view of a fluid connector, according to one embodiment.

Referring to FIG. 1, there is shown a machine 10 including a hydraulic system 12, according to one embodiment. Hydraulic system 12 includes a hydraulic pump 14, and a hydraulic actuator 16 illustrated as a hydraulic cylinder. A first pressurized hydraulic line 22 extends from pump 14, a second pressurized hydraulic line 24 extends to hydraulic actuator 16, and a fluid connector apparatus or fluid joint assembly 26 fluidly connects first hydraulic line 22 to second hydraulic line 24. A valve 18 is disposed at least partially in first hydraulic line 22. Machine 10 could include any of a wide variety of off-highway or on-highway mobile machines, such as a truck, a tractor, a skid steer loader or a wheel loader, a scraper, an excavator, a shovel, or various others. Machine 10 could also include a stationary machine such as a press, a conveyor, a lift, or any of a variety of others. Hydraulic system 12 can be configured in a great many different ways, and the illustrated arrangement is illustrative only. Those skilled in the art will contemplate additional passive as well as electrically actuated valves, accumulators, lines, additional couplers, and alternative types of hydraulic actuators or hydraulically actuated equipment, including not only hydraulic cylinders but also rotary hydraulic equipment and the like. Fluid joint assembly 26 could be one of numerous fluid joint assemblies in hydraulic system 12, each analogously configured. As will be further apparent from the following description, fluid joint assembly 26 is uniquely configured for rapid and facile connection, disconnection, and adjustment from a primary sealing state to a backup sealing state.

Referring also now to FIGS. 2-5, fluid joint assembly 26 includes a first fluid connector 30, and a second fluid connector 130 together forming a fluid coupler 28. First fluid connector 30 includes a connector body 34 having formed therein a fluid passage 48 defining a connector axis 36 extending between a first axial connector end 38 and a second axial connector end 40. Connector body 34 includes a line-connecting portion 42 forming first axial connector end 38 and a stem 44 forming second axial connector end 40. Stem 44, upon second axial connector end 40, includes a seal face 46 extending circumferentially around connector axis 36 at a backup sealing location. Seal face 46 may be oriented obliquely to connector axis 36, and may include a conical seal face, a spherical seal face, or potentially still another seal face shape such as a knife edge in some embodiments. Fluid passage 48 extends through line-connecting portion 42 and stem 44. First fluid connector 30 (hereinafter "fluid connector 30") further includes a non-metallic seal 50 upon stem 44 and extending circumferentially around connector axis 36 at a primary sealing location. Fluid connector 30 further includes a swivel nut 52 including threads 54 and a snap retainer 56 and being supported for rotation upon stem 44 of connector body 34 and for translation as further discussed herein.

Connector body 34, and in the illustrated embodiment stem 44, has formed therein a seal groove 58 and non-metallic seal 50 is seated in seal groove 58. Stem 44 may include a tip 62 located axially outward of seal groove 58. Seal face 46 may be formed on tip 62 and oriented obliquely to connector axis 36 as described herein. Axially outward means a direction along an axis away from a geometric center point of the physical body or structure defining that axis. Axially inward has an opposite meaning. In an alternative embodiment, rather than forming a seal groove in first fluid connector 30 a seal groove could be formed in second fluid connector 130 and receive a non-metallic seal therein. Still other embodiments could include more than one non-metallic seal in fluid connector 30 or more than one non-metallic seal in second fluid connector 130, one in each, or multiple in each. In the illustrated embodiment a backup ring 60 is seated with non-metallic seal 50 within seal groove 58. Non-metallic seal 50 may include a conventional O-ring formed, for example, of any suitable polymeric material such as a rubber material, a rubber-like material, an elastomer, a composite, et cetera. Connector body 34 may be formed of a suitable metallic material such as an iron material or a steel material, for example. Second fluid connector 130 may be formed of a material similar or identical to connector body 34.

As noted, swivel nut 52 includes threads 54. Threads 54 may be internal threads. Swivel nut 52 also includes an outer surface 76, and an inner surface 78. Inner surface 78 may include a journal surface 74 extending circumferentially around connector axis 36 and in contact with stem 44. Threads 54 may be formed by inner surface 78 and snap retainer 56 may be carried in swivel nut 52 at a location axially outward of threads 54. Swivel nut 52 may further include a snap ring groove such as an inside ring groove 64 formed therein, and snap retainer 56 may include a snap ring 66 seated in inside ring groove 64. Threads 54 may be confined in distribution axially between journal surface 74 and inside ring groove 64. From the drawings it can be appreciated that inner surface 78 forms journal surface 74, threads 54, and inside ring groove 64. Inner surface 78 may be stepped radially outwardly from journal surface 74 to threads 54, and stepped radially outwardly from threads 54 to inside ring groove 64.

Inside ring groove 64 may form an inside snap retainer surface 88, oriented normal to connector axis 36. In other embodiments a snap retainer surface might include an outside snap retainer surface formed by outer surface 76 and structured to carry or interact with a snap retainer externally upon swivel nut 52. Swivel nut 52 may further include external tool engagement surfaces 80 and external finger engagement surfaces 82 axially between external tool engagement surfaces 80 and snap retainer 56, the use and implementation of which is further discussed herein. Tool engagement surfaces 80 may be overlapping in axial extent with journal surface 74, and finger engagement surfaces 82 overlapping in axial extent with each of threads 54 and inside ring groove 64. Tool engagement surfaces 80 may together form a hexagonal shape or another polygonal shape. Finger engagement surfaces 82 may have the form of longitudinal flutes, knurling, hatching, or some other geometric configuration different from that of tool engagement surfaces 80.

Snap retainer 56 may include a snap ring 66 seated in inside ring groove 64. Snap ring 66 may be configured in a variety of ways, and in the illustrated embodiment includes a non-uniform inner periphery. In one practical implementation snap ring 66 includes a plurality of deformable inside teeth 70 alternating with a plurality of pockets 72. A retaining ring 68, potentially multiple retaining rings, may be seated with snap ring 66 within inside ring groove 64. As will be further apparent from the following description, snap retainer 56 may interact with structures on second fluid connector 130 to enable swivel nut 52 to snap into engagement with second fluid connector 130. It should be appreciated that in an alternative configuration apparatus providing the described snap fitted coupling could be arranged such that a snap ring or like structure is carried on fluid connector 130, analogous to those features shown carried on swivel nut 52, and interacts with other structures on swivel nut 52 such as a shoulder analogous to those features shown on second fluid connector 130. Threaded engagement between threads 54 and external threads 154 on fluid connector 130 enables swivel nut 52 to be advanced relative to fluid connector 130 to achieve the desired snap fitted connection and retracted to reverse the snap fitted connection. It is contemplated snap fitting of fluid connector 30 and second fluid connector 130 can be achieved through hand manipulation rotation of swivel nut 52 by a user.

Connector body 34, upon stem 44, may further include an annular stop protrusion 84 extending circumferentially around connector axis 36. Swivel nut 52 may be slidable upon stem 44 between a first stop position in contact with stop protrusion 84, and a second stop position such as in contact with line-connecting portion 42. Second fluid connector 130 may further include an annular stop shoulder 150. Stop shoulder 150 includes a shoulder surface 188, oriented normal to connector axis 36 in the illustrated embodiment, that is engaged by snap ring 66 as further discussed herein. Stop shoulder 150 may further include a ramp surface 152 oriented obliquely to connector axis 36. When fluid connector 30 and fluid connector 130 are coaxially arranged in a primary sealing state, snap retainer 56 limits translation of swivel nut 52 in a deinstallation direction via contact with stop shoulder 150 to maintain a primary seal 100 formed by non-metallic seal 50 between first fluid connector 30 and second fluid connector 130. Snap retainer 56 may permit translation of swivel nut 52 in a backup sealing direction opposite to the deinstallation direction to establish a backup seal 102 formed by metal-to-metal contact between first seal face 46 and a second seal face 146 of second fluid connector 130. Stop protrusion 84 limits translation of swivel nut 52 relative to connector body 34 in the backup sealing direction. Second seal face 146 extends circumferentially around connector axis 36 and is positioned at an axial gap 149 from first seal face 46 when fluid joint assembly 26 is in its primary sealing state. A fluid passage 148 extends through fluid connector 130.

As can also be seen from the drawings, stem 44 may include an engagement indicator 86 located axially between stop protrusion 84 and line-connecting portion 42. Engagement indicator 86 may be exposed when swivel nut 52 is at the first stop position and obscured by swivel nut 52 when swivel nut 52 is at the second stop position. In the illustrated embodiment engagement indicator 86 includes an indicator groove extending circumferentially around connector axis 36. In other embodiments an engagement indicator could be of a different structure, or could include any suitable form of tactile feature or an indelible marking.

INDUSTRIAL APPLICABILITY

Referring to the drawings generally, but also now to FIGS. 6-11, there is depicted fluid joint assembly 26/fluid coupler 28 at various stages of assembly. In FIGS. 6 and 7 fluid connector 30 and second fluid connector 130 are shown as they might appear coaxially arranged but prior to inserting stem 44 into fluid connector 130. In FIGS. 8 and 9 stem 44 has been inserted into fluid connector 130 to fluidly connect fluid passage 48 to fluid passage 148. Non-metallic seal 50 fluidly seals between fluid connector 30 and fluid connector 130 to establish primary seal 100. In FIGS. 10 and 11 threads 54 are engaged with threads 154 by rotating swivel nut 52 to advance snap retainer 56 over ramp surface 152 and snap ring 66 over stop shoulder 150. It will be appreciated that in this illustrated embodiment inside teeth 70 may resiliently deform as they are axially advanced over ramp surface 152. Snap fitting swivel nut 52 to fluid connector 130 thus attaches fluid connector 130 to fluid connector 130 and establishes primary seal 100.

Figure 4:
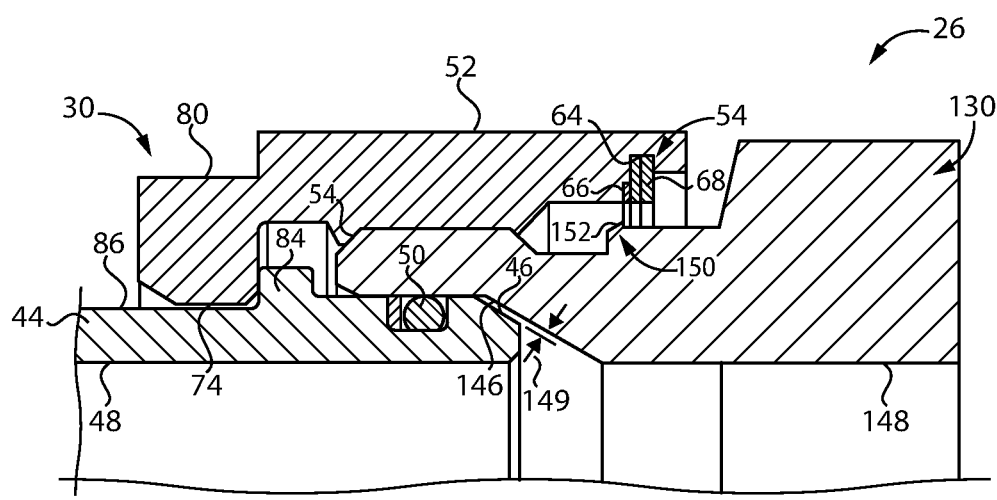
FIG. 4 is a sectioned side diagrammatic view of a fluid joint assembly in a primary sealing state, according to one embodiment.
Figure 5:
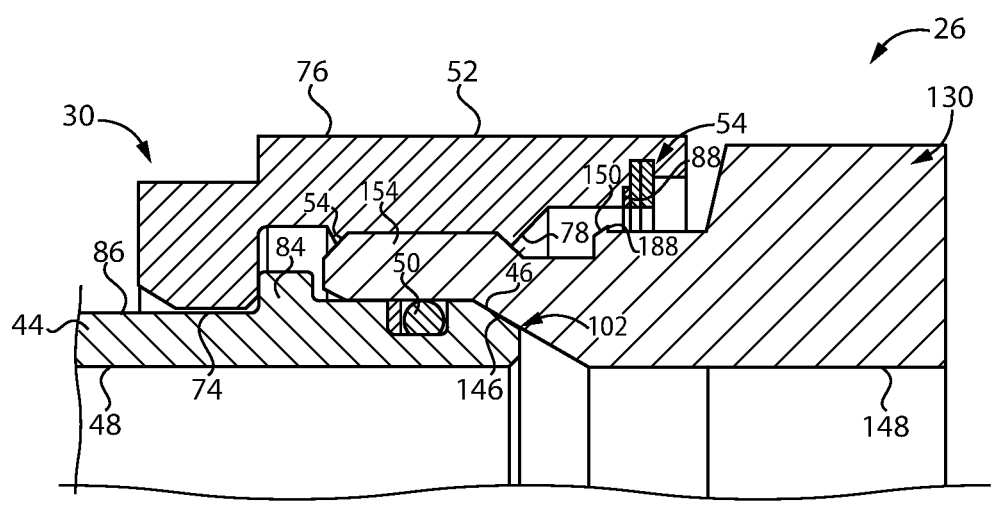
FIG. 5 is a sectioned side diagrammatic view of a fluid joint assembly in a backup sealing state, according to one embodiment.

Focusing back to FIG. 4, there can be seen fluid joint assembly 26/fluid coupler 28 as it might appear where snap retainer 56 has been thusly engaged with stop shoulder 150. In the primary sealing state as shown, seal face 146 is positioned at axial gap 149 from seal face 46. Axial gap 149 is axial in the sense that there is at least an axial directional component to axial gap 149. Axial gap 149 can also include a radial component such as might be expected where conical seal faces 46 and 146 are spaced from one another and coaxially arranged. Spherical seal faces, or one spherical and one conical, or still another arrangement, could be similarly arranged at an axial gap at this sealing state. It will be recalled a primary sealing state can be established by hand tightening swivel nut 52. A backup sealing state can be established by further engagement of threads 54 and 154, and can be achieved by applying a torque to swivel nut 52 by way of a tool in contact with tool engagement surfaces 80, for example. Application of a torque such as with a tool can cause seal face 46 and seal face 146 to firmly abut to form backup seal 102.

In the manner generally described herein it will thus be appreciated that a user can hand tighten swivel nut 52 to quickly and easily establish fluid communication between first pressurized hydraulic line 22 and second pressurized hydraulic line 24. In the event that leakage, seal failure, or another problem or need is detected, a user can apply tool tightening to swivel nut 52 to establish the more robust backup seal. The backup seal might be used where especially high hydraulic pressures, dynamic pressure changes, combustible or caustic fluids, or some other factor is deemed to justify the more robust sealing employing metal-to-metal contact as described herein. When disassembly from either of a primary sealing state or a backup sealing state is desired swivel nut 52 can be rotated in a reverse direction to pop snap retainer 56 back over stop shoulder 150 and separate the parts.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A fluid connector comprising:
 a connector body defining a connector axis, and including a line-connecting portion, a stem including a seal face extending around the connector axis at a backup sealing location, and a fluid passage extending through the line-connecting portion and the stem;

a non-metallic seal upon the stem and extending around the connector axis at a primary sealing location; and a swivel nut including threads and a snap retainer and being supported for rotation upon the stem, wherein the stem includes a stop protrusion, and the swivel nut is slidable upon the stem between a first stop position in contact with the stop protrusion, and a second stop position, wherein the stem includes an engagement indicator located axially between the stop protrusion and the line-connecting portion, and the engagement indicator is exposed when the swivel nut is at the first stop position and obscured by the swivel nut when the swivel nut is at the second stop position.

2. The fluid connector of claim 1 wherein:

the stem has formed therein a seal groove and the non-metallic seal is seated in the seal groove; and the stem includes a tip located axially outward of the seal groove, and the seal face is formed on the tip and oriented obliquely to the connector axis.

3. The fluid connector of claim 1 wherein the snap retainer is carried in the swivel nut at a location axially outward of the threads.

4. The fluid connector of claim 3 wherein the swivel nut includes an inside ring groove formed therein, and the snap retainer includes a snap ring seated in the inside ring groove.

5. The fluid connector of claim 4 wherein the snap retainer further includes a retaining ring seated with the snap ring within the inside ring groove.

6. The fluid connector of claim 4 wherein the snap ring includes a plurality of inside teeth alternating with a plurality of pockets.

7. The fluid connector of claim 4 wherein the swivel nut includes a journal surface extending around the connector axis and in contact with the stem, and the threads include internal threads confined in distribution axially between the journal surface and the inside ring groove.

8. The fluid connector of claim 1 wherein the swivel nut includes external tool engagement surfaces, and external finger engagement surfaces axially between the external tool engagement surfaces and the snap retainer.

9. A fluid joint assembly comprising:

a first fluid connector defining a connector axis, and including a first seal face extending around the connector axis, and a swivel nut;

a second fluid connector coaxially arranged with the first fluid connector and including a second seal face extending around the connector axis and positioned at an axial gap from the first seal face;

a non-metallic seal forming a primary seal between the first fluid connector and the second fluid connector;

a snap retainer coupled between the swivel nut and the second fluid connector; and the snap retainer limiting translation of the swivel nut in a deinstallation direction to maintain the primary seal, and permitting translation of the swivel nut in a backup sealing direction to establish a backup seal formed by metal-to-metal contact between the first seal face and the second seal face.

10. The fluid joint assembly of claim 9 wherein the snap retainer includes a snap ring.

11. The fluid joint assembly of claim 10 wherein the swivel nut includes an inside ring groove, and the snap ring is seated in the inside ring groove.

12. The fluid joint assembly of claim 10 wherein the second fluid connector includes a stop shoulder, and the snap retainer limits the translation in the deinstallation direction via contact with the stop shoulder.

13. The fluid joint assembly of claim 9 wherein the swivel nut includes internal threads and the second fluid connector includes external threads engaged with the internal threads.

14. The fluid joint assembly of claim 9 wherein the first fluid connector includes a stop protrusion limiting translation of the swivel nut in the backup sealing direction relative to the first fluid connector.

15. The fluid joint assembly of claim 9 further comprising a first pressurized hydraulic line connected to the first fluid connector, and a second pressurized hydraulic line connected to the second fluid connector.

16. A fluid connection apparatus comprising:

a fluid connector including a connector body having formed therein a fluid passage defining a connector axis and extending between a first axial connector end and a second axial connector end having a seal face extending around the connector axis and oriented obliquely to the connector axis;

the connector body further including a stop protrusion, and a seal groove formed in the connector body and extending around the connector axis at a location axially between the stop protrusion and the seal face;

a swivel nut supported for rotation upon the connector body and for translation between a first stop position in contact with the stop protrusion, and a second stop position; and the swivel nut including a journal surface in contact with the connector body, an inside snap retainer surface oriented normal to the connector axis, and internal threads axially between the journal surface and the inside snap retainer surface.

17. The apparatus of claim 16 wherein:

the inside snap retainer surface includes a surface of a snap ring groove formed in the swivel nut;

the swivel nut includes an inner surface forming the journal surface, the threads, and the snap ring groove, and the inner surface is stepped outwardly from the journal surface to the internal threads, and from the internal threads to the snap ring groove; and the swivel nut includes an outer surface including tool engagement surfaces overlapping in axial extent with the journal surface, and finger engagement surfaces overlapping in axial extent with each of the internal threads and the snap ring groove.

18. The apparatus of claim 16 wherein the connector body further includes an engagement indicator exposed when the swivel nut is at the first stop position and obscured by the swivel nut when the swivel nut is at the second stop position.

* * * * *